US009897136B1

(12) United States Patent
Wu et al.

(10) Patent No.: US 9,897,136 B1
(45) Date of Patent: Feb. 20, 2018

(54) HINGE

(71) Applicant: HANWIT PRECISION INDUSTRIES LTD., New Taipei (TW)

(72) Inventors: Ming-De Wu, New Taipei (TW); Chih-Yuan Chen, New Taipei (TW)

(73) Assignee: Hanwit Precision Industries Ltd., New Taipei (TW)

(*) Notice: Subject to any disclaimer, the term of this patent is extended or adjusted under 35 U.S.C. 154(b) by 0 days.

(21) Appl. No.: 15/343,667

(22) Filed: Nov. 4, 2016

(51) Int. Cl.
*F16C 11/04* (2006.01)
*E05D 3/02* (2006.01)
*E05D 5/02* (2006.01)

(52) U.S. Cl.
CPC ................ *F16C 11/04* (2013.01); *E05D 3/02* (2013.01); *E05D 5/02* (2013.01); *E05Y 2900/606* (2013.01)

(58) Field of Classification Search
CPC .......... F16C 11/04; F16C 11/045; F16C 11/10
USPC ....................................... 16/2.1, 2.2, 2.3, 2.5
See application file for complete search history.

(56) References Cited

U.S. PATENT DOCUMENTS 535,389 A * 3/1895 Murdock .............. F16C 11/045 16/221
561,109 A * 6/1896 Hanlon .................... G01B 3/06 403/93
986,772 A * 3/1911 Simpson .................. G01B 3/06 403/93
1,226,172 A * 5/1917 Benjamin ................ B27G 5/02 403/97
1,226,173 A * 5/1917 Benjamin ................ G01B 3/06 30/321
1,295,841 A * 3/1919 Benjamin ............. G01L 33/566 403/97
2,583,719 A * 1/1952 White ..................... B29C 65/00 16/2.1
2,842,850 A * 7/1958 Anderson ................ G01B 3/06 235/70 R
2,892,648 A * 6/1959 Turner .................... F16C 11/10 285/119
4,001,913 A * 1/1977 Ollis ....................... E05F 1/068 16/357
5,738,475 A * 4/1998 Chaban ..................... E05D 5/12 16/193
5,764,337 A * 6/1998 Petignat ................ F16B 21/186 16/228
6,824,324 B2 * 11/2004 Hardt ...................... F16C 11/04 29/525.06
6,939,076 B2 * 9/2005 LaPointe ................. F16C 11/04 297/68

(Continued)

*Primary Examiner* — Jeffrey O'Brien
(74) *Attorney, Agent, or Firm* — Muncy, Geissler, Olds & Lowe, P.C.

(57) ABSTRACT

A hinge of low profile design includes a bearing seat member made of a non-deformable metal and providing an axle hole and a mating connection part that is fastened to a first panel member, a pivot shaft including a disc-shaped head pivotally coupled to the axle hole, a stem extended from the disc-shaped head and suspending outside the axle hole and conical riveting portion located at the distal end of the stem and riveted to a through hole of a second panel member, and a washer mounted around the step and stopped between the bearing seat member and the second panel member for allowing relative rotation between the first panel member and the second panel member smoothly and stably.

5 Claims, 8 Drawing Sheets

(56) References Cited

U.S. PATENT DOCUMENTS

| | | | | | |
|---|---|---|---|---|---|
| 7,454,838 | B2 * | 11/2008 | Gianola | B26B 2/18 | 30/254 |
| 7,654,745 | B2 * | 2/2010 | Maloney | F16C 11/04 | 384/439 |
| 7,770,258 | B2 * | 8/2010 | Rozkowski | B60R 22/26 | 16/2.1 |
| 7,979,967 | B2 * | 7/2011 | Schmidt | B21J 15/02 | 29/11 |
| 8,037,578 | B2 * | 10/2011 | Megason | F16C 11/04 | 16/2.1 |
| 8,196,261 | B2 * | 6/2012 | Hayahi | G06F 1/1616 | 16/324 |
| 8,363,359 | B2 * | 1/2013 | Slayne | F16C 27/04 | 360/265.6 |
| 8,413,303 | B2 * | 4/2013 | Nagami | F16C 11/10 | 16/334 |
| 8,944,690 | B2 * | 2/2015 | Natu | F16C 11/04 | 16/2.1 |
| 9,469,991 | B2 * | 10/2016 | Milanowski | E04C 2/405 | |
| 2004/0025295 | A1 * | 2/2004 | Becker | B60N 2/06 | 16/254 |
| 2005/0229357 | A1 * | 10/2005 | Remy | F16B 43/001 | 16/2.1 |
| 2007/0121278 | A1 * | 5/2007 | Kruger | B21J 15/02 | 361/600 |
| 2008/0066263 | A1 * | 3/2008 | Richmond | B61D 3/187 | 16/379 |
| 2011/0110711 | A1 * | 5/2011 | Basley | B21J 15/02 | 403/161 |
| 2013/0087138 | A1 * | 4/2013 | Ubach Cartategui | F24J 2/5243 | 126/696 |
| 2015/0078808 | A1 * | 3/2015 | Halcom | F16C 23/045 | 403/119 |
| 2016/0186609 | A1 * | 6/2016 | Holland | F16B 43/00 | 428/223 |
| 2016/0290391 | A1 * | 10/2016 | Hill | F16C 17/12 | |

* cited by examiner

HINGE

BACKGROUND OF THE INVENTION

1. Field of the Invention

The present invention relates to mechanical bearing technology and more particularly, to a hinge, which comprises a bearing seat member affixed to a first panel member, a pivot shaft pivotally mounted in the bearing seat member pivot shaft and providing a riveting portion that is riveted to a second panel member using a stamping technique, and a washer mounted around the pivot shaft and stopped between the bearing seat member and the second panel member for generating a damping resistance to enhance rotating stability between the first panel member and the second panel member.

2. Description of the Related Art

Hinge is a mechanical bearing for connecting two component parts together, allowing relative rotation between them. Hinge is widely used in doors, windows, telecommunication cabinets, computer servers, workstations, machines and many other equipments to pivotally connect a door panel, window panel, cabinet cover, back cover or outer cover to a door frame, window frame, cabinet body, computer server housing, workstation housing, machine housing or equipment housing. Various different designs of hinges have been created and have appeared on the market for different applications.

A hinge can be connected between two panel members by welding, screws, or riveting. However, typical conventional hinges allow only a limited angle of rotation between the two panel members. There are some other hinges designed for connecting two objects together, allowing relative rotation between them. FIG. 8 illustrates a prior art hinge design of this kind. As illustrated, the hinge A is mounted between a through hole B1 of a first panel member B and a mounting hole C1 of a second panel member C. The hinge A comprises a stepped stop flange A1 located at one end thereof and stopped at the bottom surface of the first panel member B around the through hole B1, and a retaining flange A2 located at an opposite end thereof and pivotally abutted against the top surface of the second panel member C mounting hole C1, and thus, the first panel member B and the second panel member C are connected in parallel by the hinge A and can be rotated relative to each other. This design of hinge A is a one piece member inserted through the through hole B1 of the first panel member B and the mounting hole C1 of the second panel member C. When rotating the first panel member B relative to the second panel member C on the axis of the hinge A, the periphery of the through hole B1 of the first panel member B and the periphery of the mounting hole C1 of the second panel member C will be rubbed against the stepped stop flange A1 or retaining flange A2 of the hinge A, generating large resistance and causing the hinge A to generate flash or debris. After a long use, the clearance between the hinge A and the through hole B1 of the first panel member B or the mounting hole C1 of the second panel member C will be enlarged, affecting structural stability and causing generation of vibrations during rotation between the first panel member B and the second panel member C. Therefore, there is still room for improvement.

SUMMARY OF THE INVENTION

The present invention has been accomplished under the circumstances in view. According to one aspect of the present invention, the hinge is in a mounting hole of a first panel member and riveted to a through hole of a second panel member to pivotally connect the first panel member to the second panel member, comprising a bearing seat member, a pivot shaft and a washer. The bearing seat member is made of a non-deformable metal material in one piece, comprising an axle hole cut through opposing top and bottom walls thereof and a mating connection part located on the bottom wall of the bearing seat member around the axle hole and fastened to the mounting hole of the first panel member. The pivot shaft is made of a deformable metal material in a one piece, comprising a disc-shaped head pivotally mounted in the axle hole of the bearing seat member, a stem vertically downwardly extended from the center of a bottom wall of the disc-shaped head and suspended outside the axle hole of the bearing seat member and a conical riveting portion located at a distal end of the stem opposite to the disc-shaped head. The conical riveting portion is riveted to the through hole of the second panel member using a stamping technique. Further, the conical riveting portion comprises a tapered upper guide surface disposed in close contact with a tapered mating surface in the through hole of the second panel member. The washer is made from an elastic material and mounted around the stem of the pivot shaft and stopped between the bottom wall of the bearing seat member and the top wall of the second panel member. Further, the washer comprises a center hole cut through opposing top and bottom walls thereof for the passing of the stem of the pivot shaft. Thus, the use of the washer enhances the connection stability between the bearing seat member and the pivot shaft. When fastening the bearing seat member and the pivot shaft to the first panel member and riveting to the pivot shaft the second panel member, the arrangement of the washer prohibits the pivot shaft from being forced out of the axle hole of the bearing seat member, enhancing installation stability. Further, because the washer is positioned between the first panel member and the second panel member, an appropriate gap is left between the first panel member and the second panel member. During relative rotation between the bearing seat member and the pivot shaft, the washer prevents friction between the first panel member and the second panel member and causes generation of a damping resistance, enhancing rotating smoothness and stability between the bearing seat member and the pivot shaft.

According to another aspect of the present invention, the riveting portion of the pivot shaft is riveted to the through hole of the second panel member using a stamping technique. Thus, the riveting tightness between the pivot shaft and the second panel member and the rotating smoothness of the pivot shaft relative to the second panel member can be adjusted by means of adjusting the degree of deformation of the riveting portion during the stamping process.

Further, when the riveting portion of the pivot shaft is stamped and deformed, a part of the riveting portion is forced into the through hole of the second panel member to prohibit displacement of the second panel member along the length (height) of the riveting portion of the pivot shaft. After the stamping process, the height of the riveting portion of the pivot shaft is shortened, and the combined thickness of the pivot shaft and the second panel member is relatively reduced, providing a low profile characteristic.

Further, the mating design of the tapered bearing surface of the bearing seat member around the axle hole and the tapered abutment surface of the disc-shaped head greatly increases the contact surface area between the bearing seat member and the pivot shaft without increasing the overall height of the disc-shaped head, enhancing the structural stability and shearing strength of the hinge and avoiding disconnection between the bearing seat member and the pivot shaft even if the pivot shaft is pulled or vibrated by an external force.

Other and further benefits, advantages and features of the present invention will be understood by reference to the following specification in conjunction with the accompanying drawings, in which like reference characters denote like elements of structure.

DETAILED DESCRIPTION OF THE PREFERRED EMBODIMENT

Figure 1:
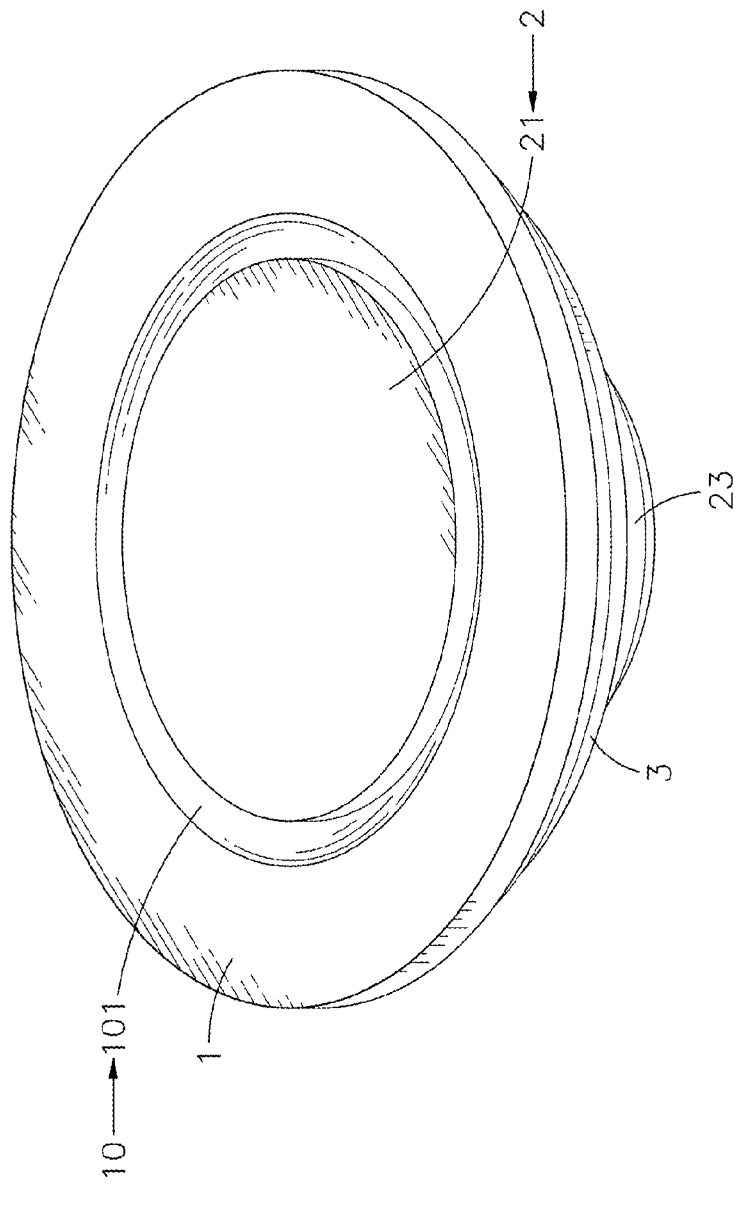
FIG. 1 is an oblique top elevational view of a hinge in accordance with the present invention.
Figure 2:
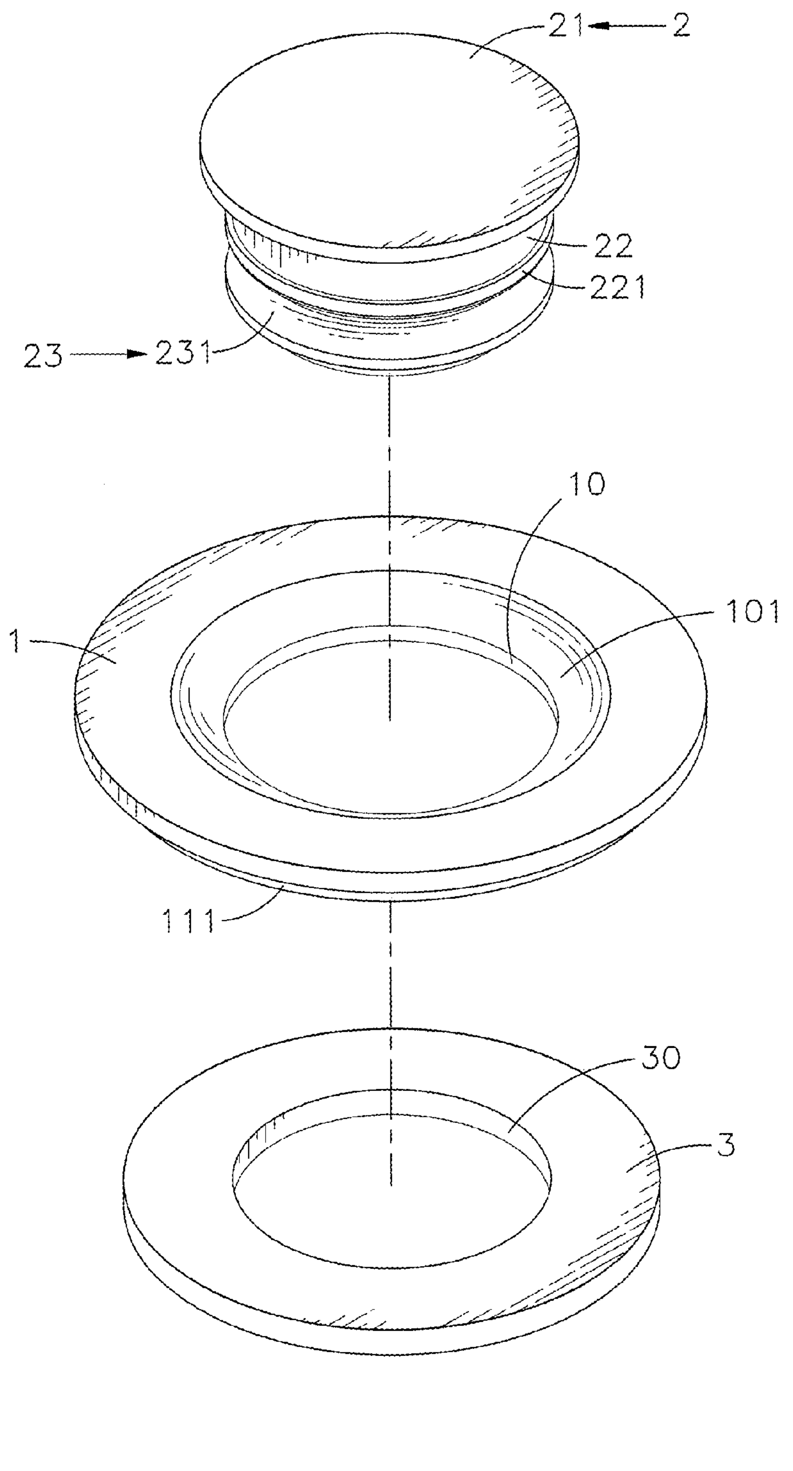
FIG. 2 is an exploded view of the hinge in accordance with the present invention.
Figure 3:
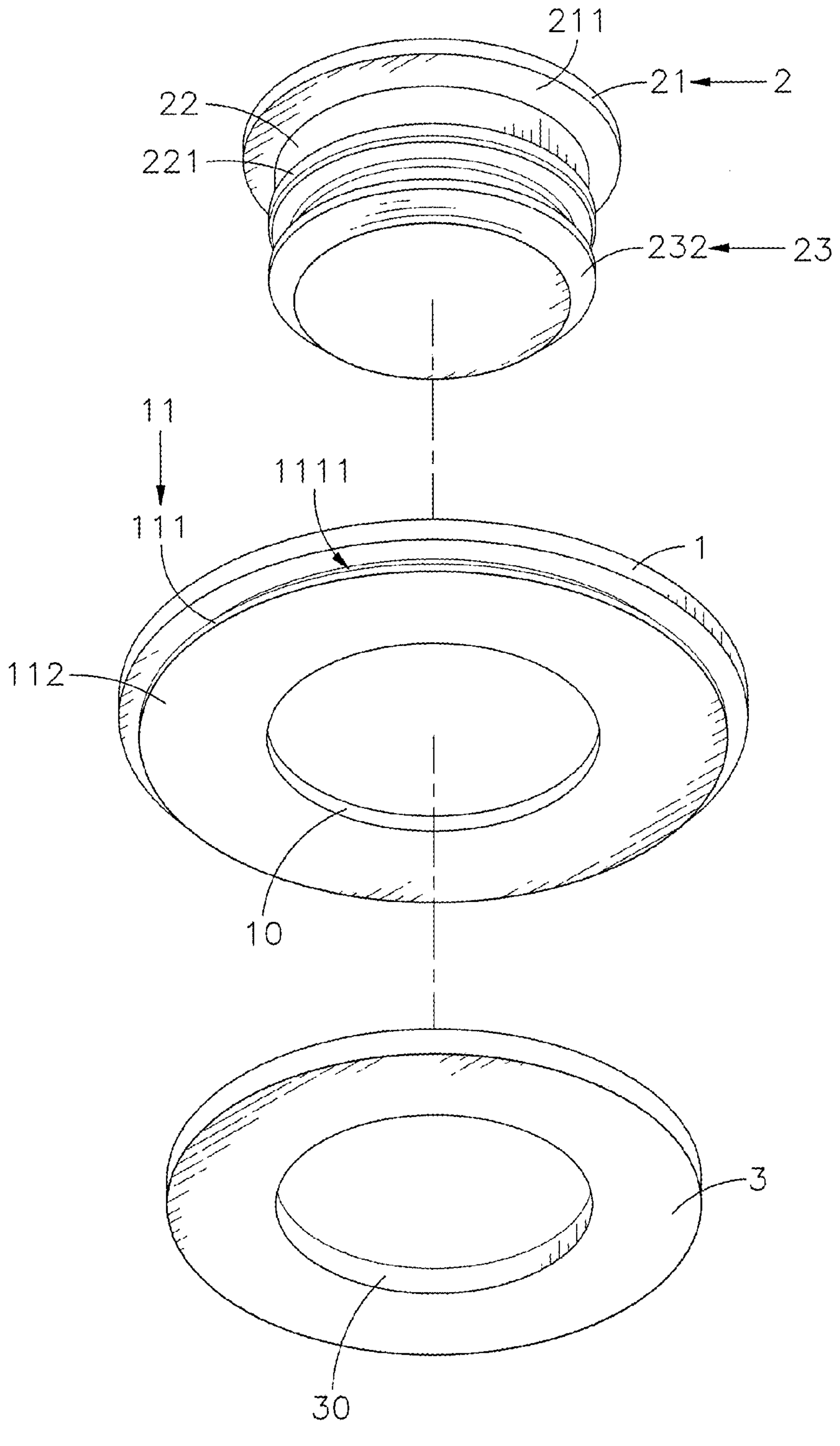
FIG. 3 corresponds to FIG. 2 when viewed from another angle.
Figure 4:
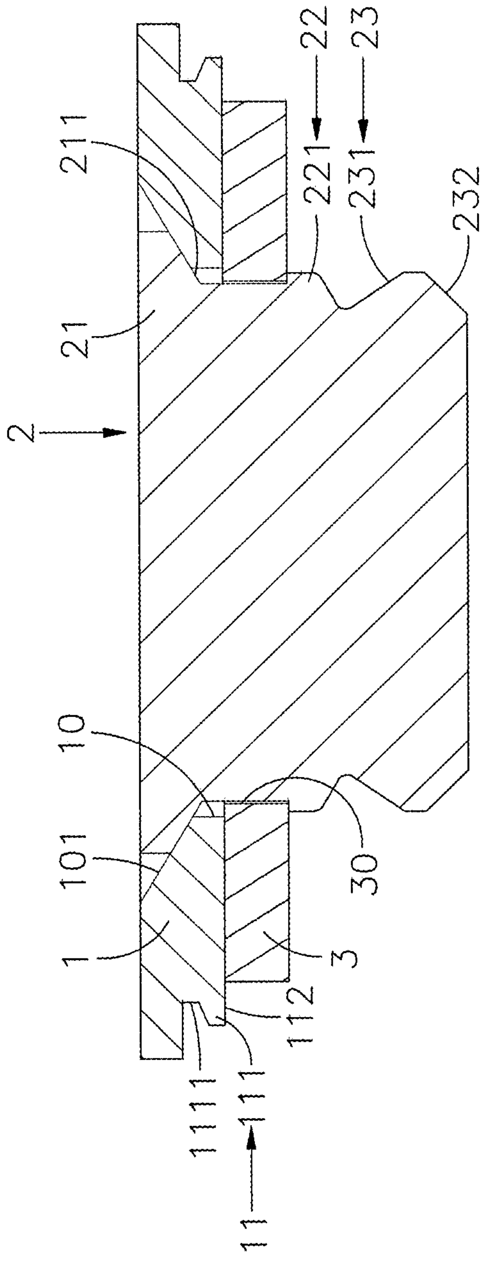
FIG. 4 is a sectional side view of the hinge in accordance with the present invention.

Referring to FIGS. 1-4, a hinge in accordance with the present invention is shown. The hinge comprises a bearing seat member 1, a pivot shaft 2, and a washer 3.

The bearing seat member 1 is a one piece member made of a high strength and high corrosion resistance metal material (such as stainless steel) that does not deform during stamping, comprising an axle hole 10 cut through opposing top and bottom walls thereof, a tapered bearing surface 101 located on the top wall around the axle hole 10 with the diameter gradually reducing toward the axle hole 10, and a mating connection part 11 located on the opposing bottom wall around the axle hole 10. The mating connection part 11 comprises a tubular shank 111 vertically downwardly extended from the bottom wall of the bearing seat member 1 around the axle hole 10, a flat abutment surface 112 extended around a distal end of the tubular shank 111 remote from the bottom wall of the bearing seat member 1, and an annular mounting groove 1111 extending around the tubular shank 111 between the bottom wall of the bearing seat member 1 and the flat abutment surface 112.

The pivot shaft 2 is a one piece member made of a high tensile strength, high ductility and high corrosion resistance metal material (such as aluminum, copper, etc.) that can be deformed during stamping, comprising a disc-shaped head 21, a stem 22 vertically downwardly extended from the center of a bottom wall of the disc-shaped head 21, a tapered abutment surface 211 located on the bottom wall of the disc-shaped head 21 with the diameter gradually reducing toward the stem 22, a stop flange 221 extended around the periphery of the stem 22, and a conical riveting portion 23 located at a distal end of the stem 22 opposite to the disc-shaped head 21 and defining a tapered upper guide surface 231 and a tapered lower abutment surface 232.

The washer 3 is a flat annular member made from rubber, plastics, silicon rubber or any other elastic material, defining therein a center hole 30 with the diameter larger than the outer diameter of the stem 22 but smaller than the outer diameter of the riveting portion 23.

In installation, insert the pivot shaft 2 downwardly through the axle hole 10 of the bearing seat member 1 to pivotally coupled the disc-shaped head 21 of the pivot shaft 2 to the axle hole 10 and to abut the tapered abutment surface 211 of the disc-shaped head 21 against the tapered bearing surface 101 around the axle hole 10 and also to let the stem 22 and riveting portion 23 of the pivot shaft 2 suspend outside the axle hole 10. At this time, the bearing seat member 1 and the pivot shaft 2 are rotatable relative to each other. Thereafter, attach the washer 3 upwardly onto the stem 22 of the pivot shaft 2. Because the washer 3 is made from an elastic material, attaching the center hole 30 of the washer 3 onto the riveting portion 23 causes the center hole 30 to expand in diameter for allowing the riveting portion 23 and the stop flange 221 of the stem 22 to pass therethrough. After the washer 3 is moved over the stop flange 221 of the stem 22, the washer 3 immediately returns to its previous shape to force the center hole 30 into abutment against the periphery of the stem 22 closely. At this time, the user can push the washer 3 upwardly to the extent where the surface of the washer 3 is abutted against the flat abutment surface 112 of the bearing seat member 1, and thus, the bearing seat member 1, the pivot shaft 2 and the washer 3 are well assembled together.

Figure 5:
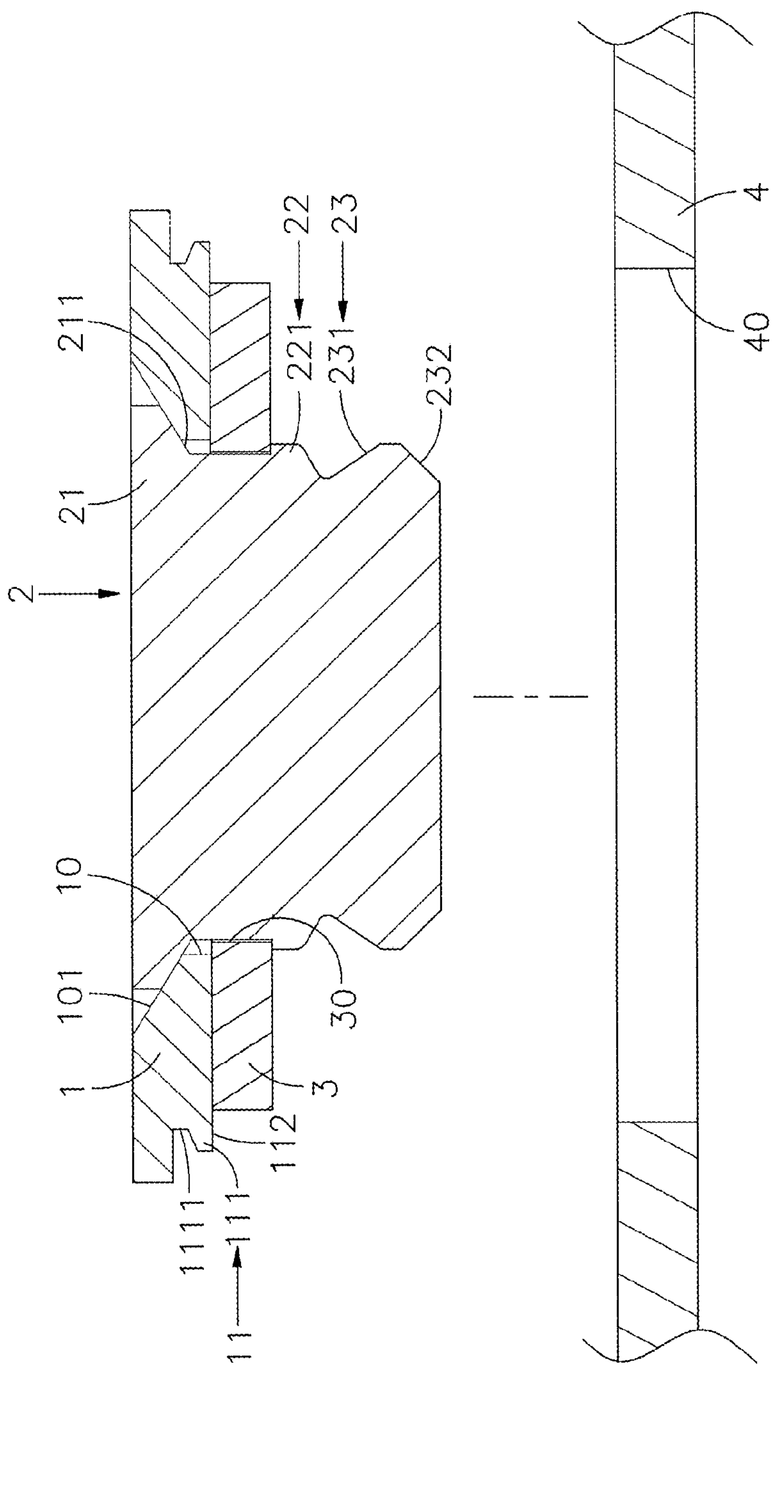
FIG. 5 is a sectional applied view of the present invention, illustrating the relationship between the hinge and the first panel member.
Figure 6:
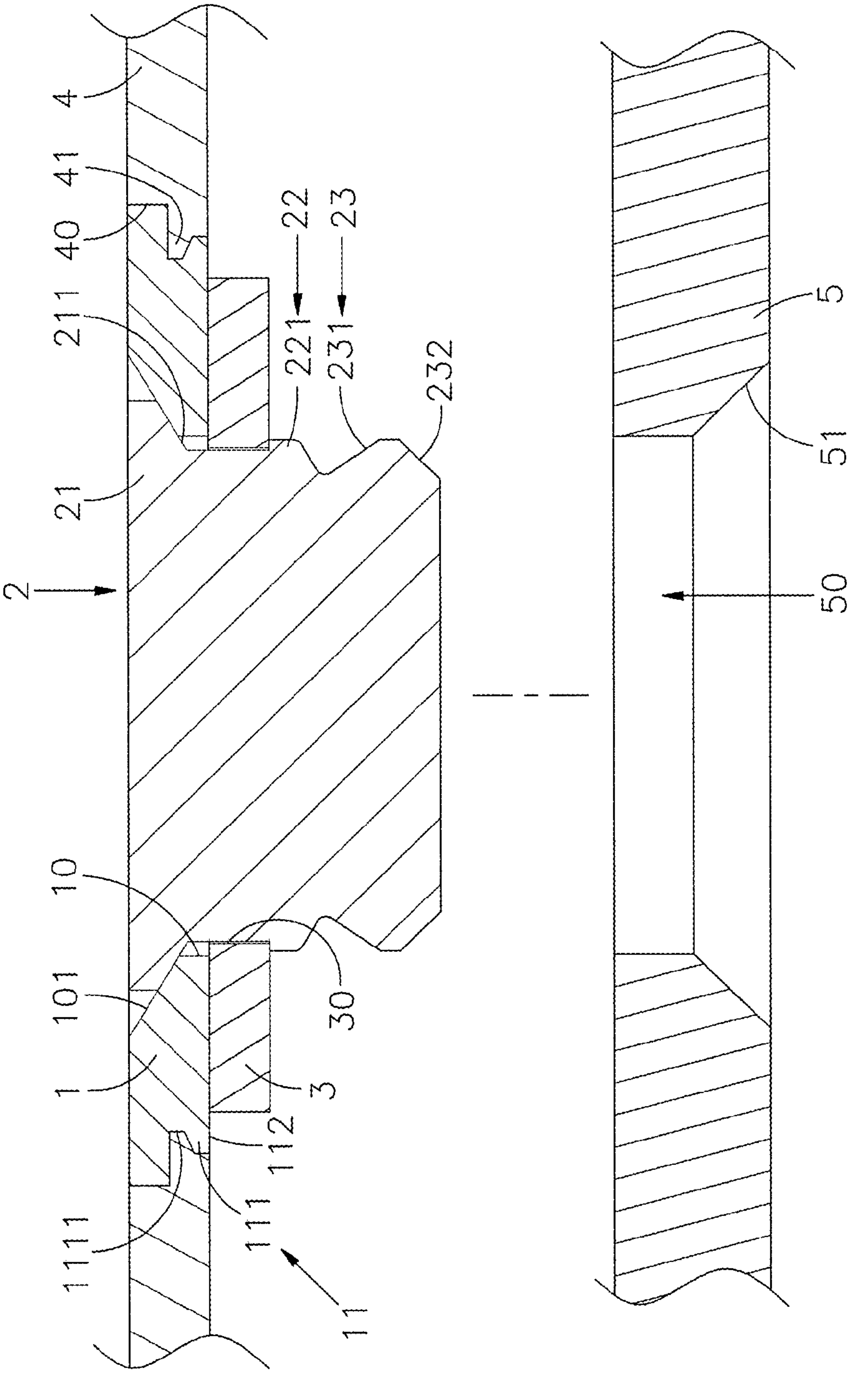
FIG. 6 is a sectional applied view of the present invention, illustrating the hinge fastened the first panel member before installation in the second panel member.
Figure 7:
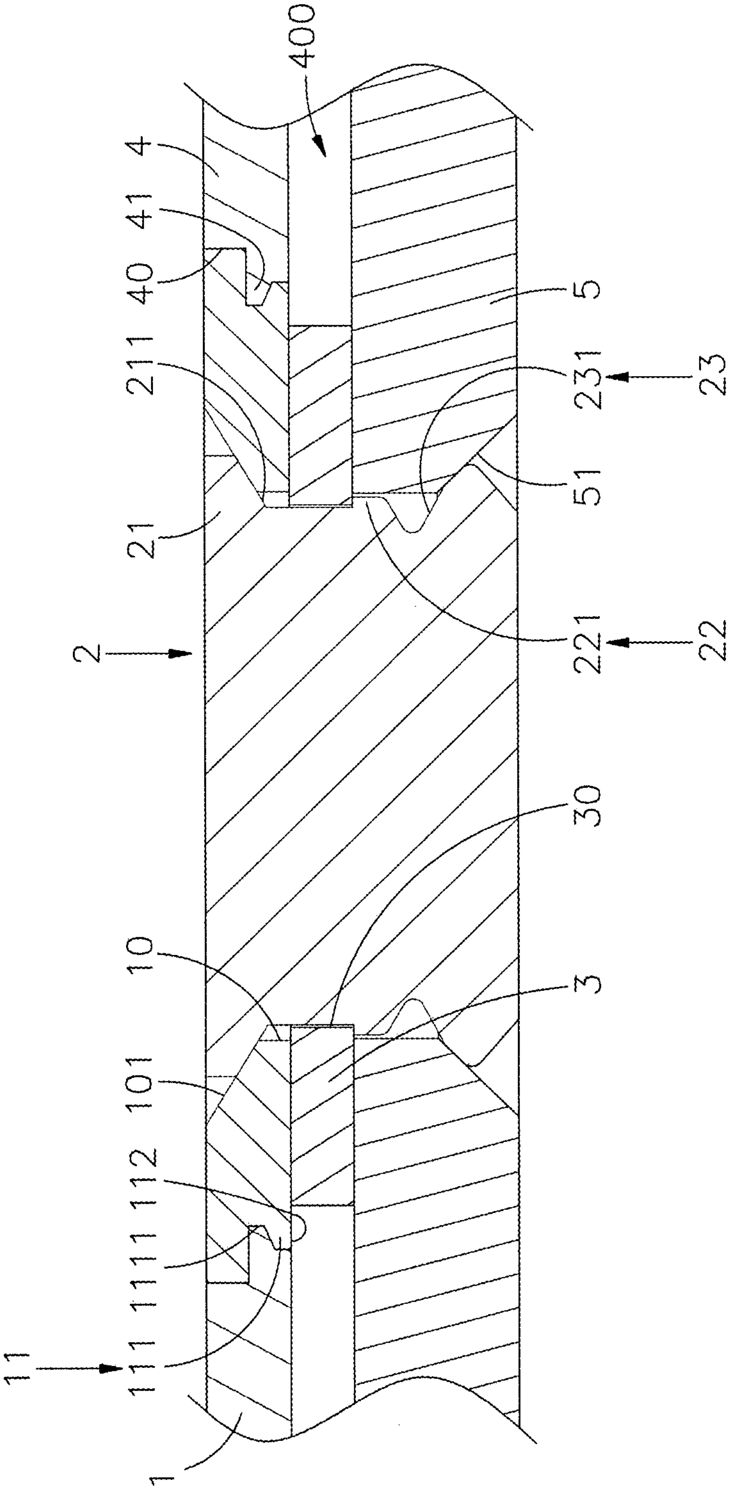
FIG. 7 is a sectional applied view of the present invention, illustrating the hinge mounted in the first panel member and riveted to the second panel member.
Figure 8:
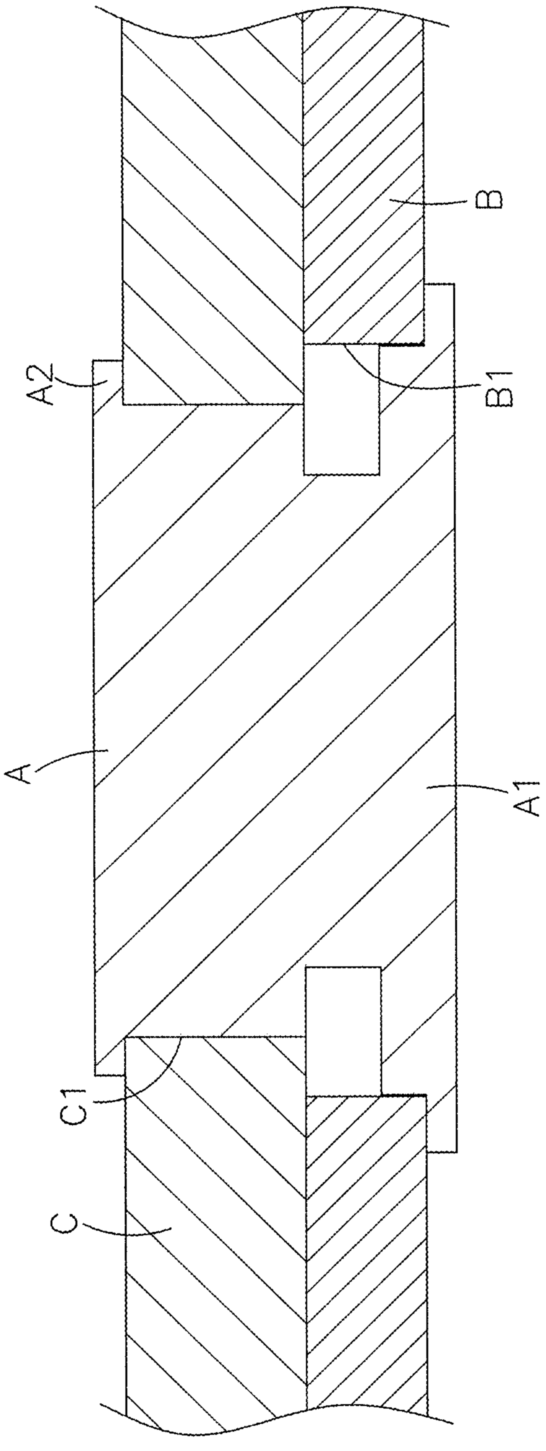
PRIOR ART FIG.8
FIG. 8 is a schematic sectional view illustrating a pivot shaft mounted in a first panel member and coupled to a second panel member according to the prior art.

Referring to FIGS. 5-7 and FIG. 4 again, when using the hinge to connect a first panel member 4 and a second panel member 5 of a telecommunication cabinet, computer server, workstation, machine, equipment, or even a door or window assembly that can be opened and closed. The first panel member 4 comprises a mounting hole 40 cut through opposing top and bottom wall thereof. The second panel member 5 is made of a metal material (such as stainless steel) that does not deform during stamping, comprising a through hole 50 cut through opposing top and bottom wall thereof and a tapered mating surface 51 defined in the through hole 50 with the diameter gradually downwardly increased in direction toward the outside of the through hole 50. In application, insert the mating connection part 11 of the bearing seat member 1 into the mounting hole 40 of the first panel member 4, and then employ a stamping process to stamp on the surface of the bearing seat member 1 or the surface of the disc-shaped head 21 of the pivot shaft 2, riveting the tubular shank 111 of the mating connection part 11 to the mounting hole 40 of the first panel member 4. At this time, the inner peripheral wall of the mounting hole 40 is deformed to form an engagement portion 41 that is forced into engagement with the annular mounting groove 1111 around the tubular shank 111 tightly, and thus, the bearing seat member 1 is fixedly fastened to the mounting hole 40 of the first panel member 4, making the surface of the bearing seat member 1 and the surface of the disc-shaped head 21 of the pivot shaft 2 to be coplanar with the surface of the first panel member 4.

After affixed the bearing seat member 1 to the mounting hole 40 of the first panel member 4, insert the riveting portion 23 of the pivot shaft 2 into the through hole 50 of the second panel member 5. By means of the guidance of the tapered lower abutment surface 232 of the riveting portion 23, the riveting portion 23 of the pivot shaft 2 can be steadily, smoothly and accurately inserted into the through hole 50 of the second panel member 5 facilitating quick alignment. As soon as the bottom surface of the washer 3 is attached to the top surface of the second panel member 5, an appropriate gap 400 is left between the first panel member 4 and the second panel member 5. Thereafter, employ a stamping technique to deform the riveting portion 23, shortening the height of the riveting portion 23 and expanding the outer diameter of the tapered upper guide surface 231 of the riveting portion 23 into positive abutment against the tapered mating surface 51 of the through hole 50, and also making the bottom surface of the riveting portion 23 to be coplanar with the bottom surface of the through hole 50 of the second panel member 5. After deformation of the riveting portion 23, the riveting portion 23 is riveted to the through hole 50 of the second panel member 5 with the tapered upper guide surface 231 of the riveting portion 23 kept in close contact with the tapered mating surface 51 of the through hole 50, and thus, the pivot shaft 2 is fastened to the through hole 50 of the second panel member 5 to secure the first panel member 4 and the second panel member 5, allowing rotation of the first panel member 4 with the bearing seat member 1 relative to the pivot shaft 2 and the second panel member 5. Because the bearing seat member 1 and the pivot shaft 2 can be synchronously rotated, friction resistance can be minimized during rotation. Further, the arrangement of the washer 3 prevents direct contact between the bearing seat member 1 and the second panel member 5, enhancing rotating smoothness between the first panel member 4 and the second panel member 5.

The use of the washer 3 enhances the connection stability between the bearing seat member 1 and the pivot shaft 2. When fastening the bearing seat member 1 and the pivot shaft 2 to the first panel member 4 and riveting to the pivot shaft 2 the second panel member 5, the arrangement of the washer 3 prohibits the pivot shaft 2 from being forced out of the axle hole 10 of the bearing seat member 1, enhancing installation stability. Further, because the washer 3 is positioned between the first panel member 4 and the second panel member 5, the aforesaid appropriate gap 400 is left between the first panel member 4 and the second panel member 5. During relative rotation between the bearing seat member 1 and the pivot shaft 2, the washer 3 prevents friction between the first panel member 4 and the second panel member 5 and causes generation of a damping resistance, enhancing rotating smoothness and stability between the bearing seat member 1 and the pivot shaft 2.

Further, the invention employs a stamping technique to rivet the riveting portion 23 of the pivot shaft 2 to the through hole 50 of the second panel member 5, the riveting tightness between the pivot shaft 2 and the second panel member 5 and the rotating smoothness of the pivot shaft 2 relative to the second panel member 5 can be adjusted by means of adjusting the degree of deformation of the riveting portion 23 during the stamping process.

Further, as stated above, when the riveting portion 23 of the pivot shaft 2 is stamped and deformed, a part of the riveting portion 23 is forced into the through hole 50 of the second panel member 5 to prohibit displacement of the second panel member 5 along the length (height) of the riveting portion 23 of the pivot shaft 2. After the stamping process, the height of the riveting portion 23 of the pivot shaft 2 is shortened, and the combined thickness of the pivot shaft 2 and the second panel member 5 is relatively reduced, providing a low profile characteristic.

Further, the mating design of the tapered bearing surface 101 of the bearing seat member 1 around the axle hole 10 and the tapered abutment surface 211 of the disc-shaped head 21 greatly increases the contact surface area between the bearing seat member 1 and the pivot shaft 2 without increasing the overall height of the disc-shaped head 21, enhancing the structural stability and shearing strength of the hinge and avoiding disconnection between the bearing seat member 1 and the pivot shaft 2 even if the pivot shaft 2 is pulled or vibrated by an external force.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A hinge mounted in a mounting hole of a first panel member and riveted to a through hole of a second panel member to pivotally connect said first panel member to said second panel member, comprising:

a bearing seat member made of a non-deformable metal material in one piece, said bearing seat member comprising an axle hole cut through opposing top and bottom walls thereof and a mating connection part located on the bottom wall of said bearing seat member around said axle hole and fastened to said mounting hole of said first panel member;

a pivot shaft made of a deformable metal material in a one piece, said pivot shaft comprising a disc-shaped head pivotally mounted in said axle hole of said bearing seat member, a stem vertically downwardly extended from the center of a bottom wall of said disc-shaped head and suspended outside said axle hole of said bearing seat member and a conical riveting portion located at a distal end of said stem opposite to said disc-shaped head and riveted to the said through hole of said second panel member, said conical riveting portion comprising a tapered upper guide surface disposed in close contact with a tapered mating surface in the said through hole of said second panel member; and a washer made from an elastic material and mounted around said stem of said pivot shaft and stopped at the bottom wall of said bearing seat member, said washer comprising a center hole cut through opposing top and bottom walls thereof for the passing of said stem of said pivot shaft;

wherein said pivot shaft further comprises a stop flange extended around the periphery of said stem and stopped against the bottom wall of said washer.

2. The hinge as claimed in claim 1, wherein said bearing seat member further comprises a tapered bearing surface located on the top wall thereof around said axle hole, said tapered bearing surface having a diameter gradually reducing toward the inside of said axle hole; said pivot shaft further comprises a tapered abutment surface located on the bottom wall of said disc-shaped head and abutted against said tapered bearing surface of said bearing seat member, said tapered abutment surface of said pivot shaft having a diameter gradually reducing toward said stem and mating the diameter of said tapered bearing surface of said bearing seat member.

3. The hinge as claimed in claim 1, wherein said mating connection part of said bearing seat member comprises a tubular shank vertically downwardly extended from the bottom wall of said bearing seat member around said axle hole, a flat abutment surface extended around a distal end of said tubular shank remote from the bottom wall of said bearing seat member and stopped against said washer, and an annular mounting groove extending around said tubular shank between the bottom wall of said bearing seat member and said flat abutment surface.

4. The hinge as claimed in claim 1, wherein said conical riveting portion further comprises a tapered lower abutment surface spaced below said tapered upper guide surface and deformed to become coplanar with a bottom wall of said second panel member around said through hole of said second panel member.

5. The hinge as claimed in claim 1, wherein the diameter of said center hole of said washer is larger than the outer diameter of said stem but smaller than the outer diameter of said riveting portion.

* * * * *